(No Model.)
W. J. TAYLOR.
ART OF TREATING AND CALCINING IRON ORES.
No. 380,229. Patented Mar. 27, 1888.
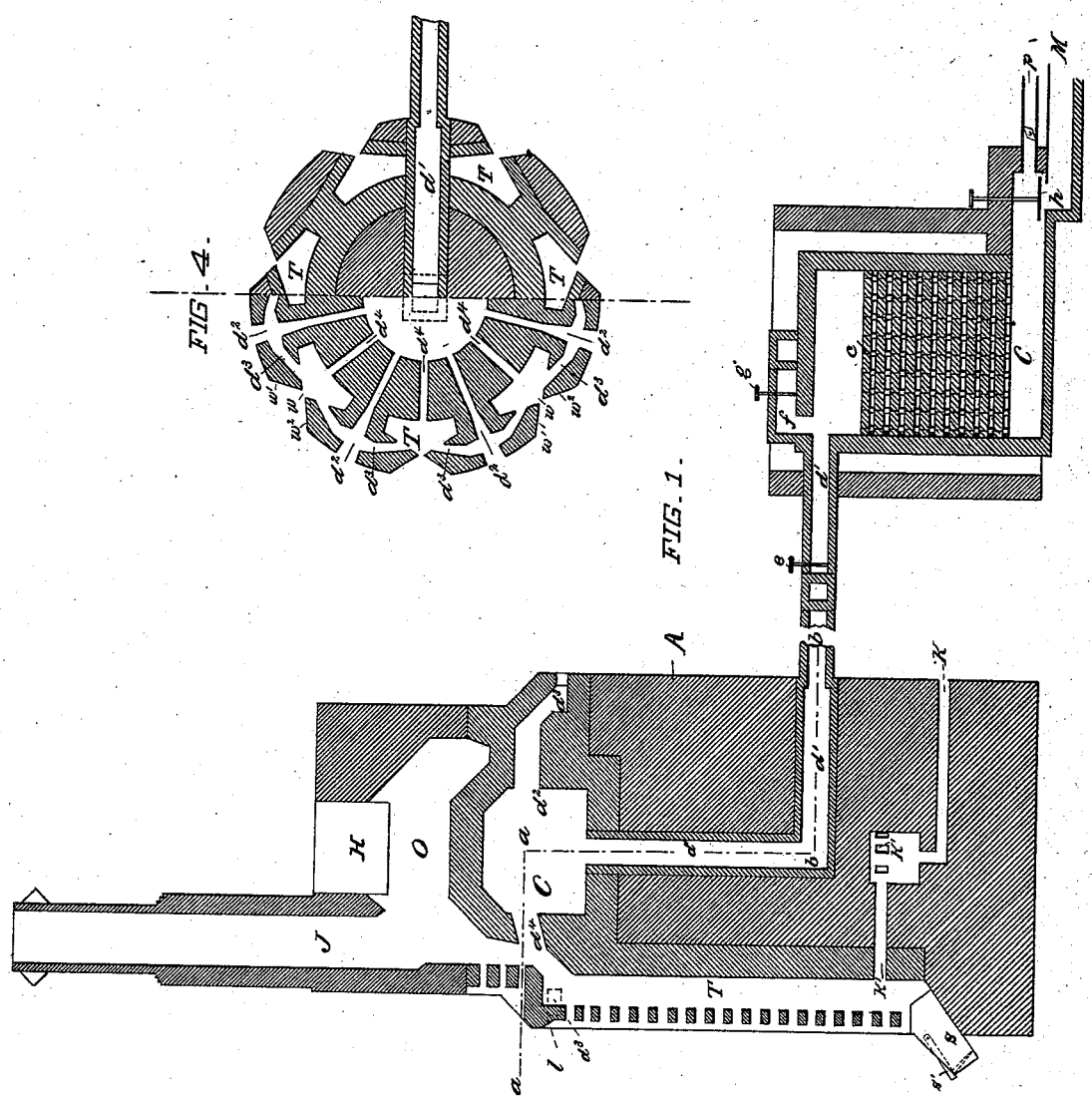
WITNESSES:
INVENTOR:

(No Model.) 2 Sheets—Sheet 2.
W. J. TAYLOR.
ART OF TREATING AND CALCINING IRON ORES.
No. 380,229. Patented Mar. 27, 1888.
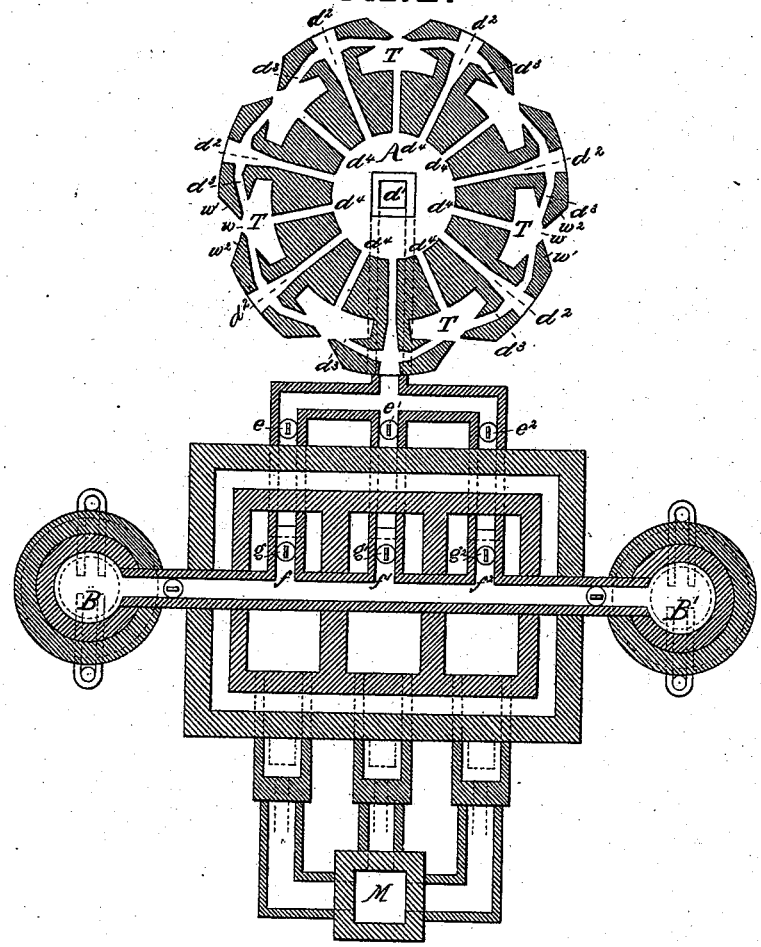
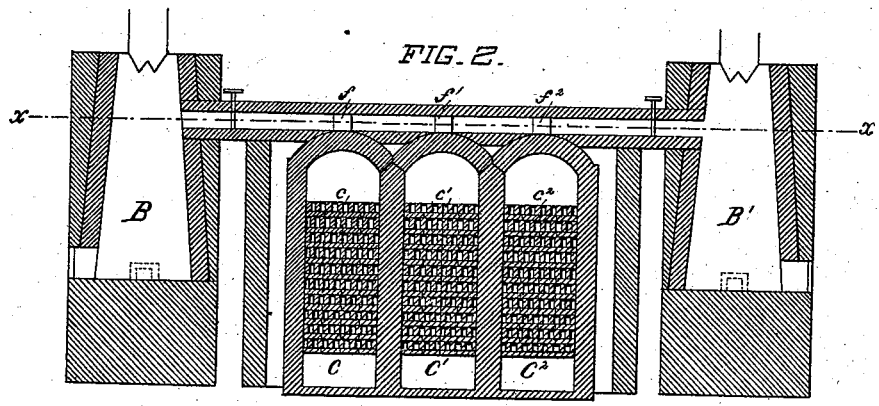
WITNESSES:
INVENTOR:

UNITED STATES PATENT OFFICE.

WILLIAM J. TAYLOR, OF CHESTER, NEW JERSEY.

ART OF TREATING AND CALCINING IRON ORES.

SPECIFICATION forming part of Letters Patent No. 380,229, dated March 27, 1888.

Application filed August 31, 1885. Serial No. 175,835. (No specimens.)

*To all whom it may concern:*

Be it known that I, WILLIAM J. TAYLOR, of Chester, in the county of Morris and State of New Jersey, have invented certain new and useful Improvements in the Art of Treating and Calcining Iron Ores, of which improvements the following is a specification.

My invention relates to a method or process of calcining or roasting iron ores, in which control of the temperature within the necessary limits is secured and a more intensely-oxidizing atmosphere than has heretofore been possible is obtained by not bringing the products of combustion, which are mainly more reducing than oxidizing, into contact at all with the ores in the kiln.

My invention consists in conducting the gas preferably from a gas producer or producers through suitable conduits into a series of fire-brick chambers or regenerators filled with brick checker-work or other similar material, with suitable spaces between the bricks to allow of the absorption by them of the heat of combustion, then through suitable conduits, conveying the heat so stored up in the series of brick regenerators alternately through the medium of atmospheric air required for oxidation into an ore-roasting kiln, and admitting cold air near the bottom thereof, so that the heat of the ore, which would otherwise be largely withdrawn, may be carried back to the upper part of the chambers in the kiln supporting the heat of the hot zone, in order that the most active and intensely oxidizing atmosphere available in practice for thoroughly and completely oxidizing the sulphur in the ore may be obtained and maintained continuously, with practically no heat extracted from the kiln, and for making a higher oxide of iron when a lower oxide is being roasted.

Various methods and means have been resorted to for the roasting and calcining of iron ores containing sulphur for its elimination or other elements which it is eminently desirable should be volatilized or oxidized; but the results obtainable from the processes heretofore availed of have only been partially satisfactory, due, principally, to the difficulty experienced in maintaining a free current of air for a supply of oxygen.

The objectionable contingency of irregular heating of the ore—that is, either heating some of the ore to fusion or else not heating it enough—has to a greater or less degree been found in practice unavoidable where the ores have been roasted with solid fuel—that is, coal mixed with the ore—or even where gaseous fuel has been used.

The calcining of sulphurous ores may be generally defined as subjecting them to heat in the presence of atmospheric air. It is well known that a proper calcination of these ores before treatment in the blast-furnace facilitates their reduction, and what is most desirable to have at this stage of the process is an oxidizing atmosphere in contradistinction to that which is obtained in the upper zone of the blast-furnace, which is a deoxidizing atmosphere.

In the elimination of the sulphur great difficulty has been experienced, due, mainly, to being unable to maintain a strongly-oxidizing atmosphere, together with a proper temperature, for any length of time. While this is absolutely essential, yet, nevertheless, in all the processes as heretofore practiced, as far as I am aware, they have failed in this particular; and it is the principal object of my present invention to accomplish this end—that is, to maintain as intensely-oxidizing atmosphere as is possible during the whole time the ore is being subjected to the calcining or roasting operation, in order that the sulphur may receive its proper associating equivalent of oxygen to convert it into sulphurous-acid gas, or otherwise the tendency of the sulphur will be to sublime. Sulphur occurs almost exclusively in iron ores in the form of disulphide of iron, ($FeS_2$,) commonly known as "iron pyrites." One atom of sulphur may be readily separated or dissociated from this combination by a sufficient elevation of the temperature without regard to the nature of the atmosphere surrounding the ore, while if the atmosphere is reducing the sulphur merely sublimes and condenses in a cooler part of the apparatus, and if, on the other hand, it is oxidizing in character, the escaping sulphur is instantly oxidized into sulphurous-acid gas, ($SO_2$.) A mere elevation of the temperature to the point of dissociation of the first atom of sulphur from the ore will not suffice to expel the remaining atom, and for this reason it is essential that the atmosphere in contact with the ore under treatment should be strongly oxidizing, because while the high temperature will not volatilize the second atom, yet it will lessen the affinity between the sulphur and the iron to such an extent as to permit the oxygen, if present, to overcome such affinity and enter into combination with the sulphur, forming sulphurous-acid gas, and of course it will be understood that the expulsion of the first atom of sulphur renders the ore more or less porous and greatly facilitates the second operation of expelling the remaining atom. This porosity enables the oxygen present to more readily penetrate the ore, and even if the temperature be not raised above the point required for the volatilization of the first atom, provided a sufficient quantity of oxygen be present, the oxidation of the remaining portion of the sulphur will be readily accomplished. Naturally, however, the higher the heat below the point of fusion the more readily does the oxygen combine with the sulphur and the more quickly is the elimination of the sulphur effected; but of course at a comparatively low temperature—say from 500° to 1,000° Fahrenheit—oxidation will go on, yet at any temperature below that of the dissociation of the first atom of sulphur from a disulphide of iron the process is so very slow that it is impracticable or inoperative.

To accomplish the complete oxidation of both sulphur and ore, it is then absolutely essential and necessary that entire control over both the temperature and admission of the air during the entire time of calcining or roasting should be had, and in practice I have found that if the pure atmospheric air only can be admitted to the ore, when it has attained a high heat, the process is very much more rapid and satisfactory than if the air has been diluted with the gases of combustion, as was the case with the processes as heretofore practiced for the calcining or roasting of iron ores.

I have shown and described a plant or apparatus for the conduct of my improved process; yet, nevertheless, it is obvious that such plant or apparatus will admit of modifications as to minor details of the same without departing from the essential features of my present invention—to calcine or roast iron ores without permitting the products of combustion, which are mainly more reducing than oxidizing, to come in contact with the ores at all during the calcining operation.

In the accompanying drawings, Figure 1 is a longitudinal section through three regenerators, showing in section an ore-roasting kiln. Fig. 2 is a cross-section through a series of regenerators and gas-producers. Fig. 3 is a sectional plan view of the gas producers and regenerators on the line $x\,x$ of Fig. 2, showing also a section of the ore-roasting kiln; and Fig. 4 is a sectional view of a kiln with the ore-chambers, showing the hot-air chambers and the inlet and outlet hot-air flues to the same on the lines $a\,a$ and $b\,b$ of Fig. 1.

Referring now to the drawings, B B' are the gas-producers for generating the heating-gas from the combustion of the coal. These gas-producers may be made of any suitable form and of a capacity relative to that of the kiln and hot-air chambers or regenerators.

C C' C² are a series of fire-brick chambers or regenerators, preferably three in number, filled in with fire-bricks or checker-work $c\,c'\,c^2$, or their equivalents, and so laid up as to allow of a space between each of them for the passage of the products of combustion to the chimney while being heated. In passing through the chambers the heat generated by the burning gases is absorbed by the brick checker-work $c\,c'\,c^2$ loosely piled up therein. The gas is conveyed from the producers or generators B B' to the combustion-chambers of the series of regenerators C C' C² through the conduits or flues $f, f'$, and $f^2$, and the air for the combustion of the gases is preferably admitted through the hot-air-discharge flue $d'$ by opening the dampers $e$ and $e'$ or $e'$ and $e^2$ sufficiently to admit hot air enough for the combustion of the gas from the hot air passing to the ore-roasting kiln, and hence it will be readily observed that by the use of hot air for combustion a very high and uniform or regular temperature is obtained and can be maintained continuously by reversing often.

A is the kiln for roasting the ore, which may be in form cylindrical, with triangular vertical chutes or ore-chambers T, arranged near the outer periphery of the same, having a common ore-receiving chamber, O, in the upper part of the kiln, which is connected at the top with an iron cylinder, H, into which the ore is deposited. The bottom of this iron cylinder H is lower than the top walls of the chamber O. An annular space is thus formed over the ore in the side or top of the receiving or distributing chamber for the reception of the sulphur gases escaping through the hot ore, which annular space is connected with the chimney or uptake J, for discharging the sulphur gases into the open air; or these gases may be conveyed from the chimney to a converter and converted into a sulphur of commerce. From the bottom of the ore-receiving chamber O the ore is drawn into the triangular vertical ore chutes or chambers T as fast as the finished product has been drawn out of the chambers below through the iron chutes S after having been sufficiently heated above by the hot air.

In a kiln as above described I am enabled to enter the hot air into the center of the kiln A through the flue $d'$ into the central hot-air receiving and distributing chamber, D, and discharge it radially through the flues $d^2$, carrying it to the front of the ore in the vertical ore-chamber T, and to then discharge it circumferentially through the flue $d^3$ under the offset $l$ and convey the hot air directly into the back of the ore through the flue $d^4$ from the central hot-air receiving and distributing chamber, D. One or more direct flues from this central hot-air receiving and distributing chamber to each ore-chamber may be used if it should be deemed necessary, and a very regular or uniform distribution of the heat is attained and can be maintained, together with the temperature necessarily demanded, continuously by such arrangement of apparatus for the conduct of my improved process.

The advantages of using the triangular or V-shaped vertical ore-chambers T, as shown in Figs. 1 and 4, extending from the drawing-chutes to the bottom of the receiving or distributing chamber D, are very great when combined with the ore-working openings $w$, with their flaring sides $w'$ $w^2$ diverging from the opening $w$, so as to be nearly in line in reverse way with the two flaring sides of the ore-chamber T, in order that ready access may be had to the ore by suitable devices, such as bars for working the ore, and punching it down through these openings $w$. These working-openings $w$ are preferably close together and protected from the outside by cast-iron plates properly arranged to take the wear of the working-bars and so arranged that they may be closed with fire-brick set in at all times when not open for examination and working. The top of the iron chute S, from which the roasted ore is drawn, should be closed by a lid, $s'$, of any suitable construction, and made of such material as may be best adapted for the purpose, so as to prevent the escape of cold air, which may be forced in through a conduit or flue, K, and into the ore by the radial flues or conduits K', and which enters the ore-chambers T near the bottom thereof in such quantity as to cause a return of the heat of the ore passing down through these ore-chambers to the hot zone; or, in other words, by the introduction of the cold air near the bottom of the ore-chambers the heat in the ore, which would be otherwise largely withdrawn, is carried back to the upper part of the chambers supporting the heat of the hot zone, and in this way an active oxidizing atmosphere is obtained and maintained continuously, and practically no heat is extracted from the kiln.

The volume or quantity of cold air and the volume and temperature of hot air introduced, as hereinbefore fully explained, can be very readily and effectively regulated in practice. By this process of calcining iron ores the sulphur gases discharged are not diluted with the products of combustion, but only with nitrogen, so that the by-product thus obtained can be more readily converted into sulphuric acid.

The admission of the gases from the producers or gas-generators B and B' is regulated by the valves $g$, $g'$, and $g^2$, and after one or more of the regenerators C C' C², with their brick checker-work $c$ $c'$ $c^2$, have been heated up to the desired temperature a current of atmospheric air is drawn or driven through the conduit or flue $p$ into the regenerator C, through the flue $d'$ into the kiln A, minus whatever quantity of air has been demanded in the two remaining generators for effecting the combustion of the gases therein, being heated up for utilization. If natural draft should be used, the hot air for combustion, as above described, could not be made available.

By the time that the temperature of the first regenerator, C, has been reduced to a minimum by the giving off of its heat to the air and has then been conveyed to the ore-roasting kiln A one of the other regenerators will have been heated up sufficiently for utilization, and by closing the valve $g'$ the gas is shut off from the hot regenerator and the air turned on in a reverse way from a fan or other similar blowing device through the pipe $p$, and the chimney-flue M will have been closed by the damper $h$ and the hot-air damper $e$ opened, the hot air passing through the flue $d'$ into the receiving and distributing chamber D of the kiln, thence through the radial flues $d^2$ and $d^4$ and the circumferential flue $d^3$ into the ore to be heated. The cold air is shut off at the pipe $p$ of the cold regenerator C', the chimney-damper $h'$ and the gas-damper $g'$ are opened, the hot-air damper $e'$ is partially opened, and the cold regenerator C' thence heated to a maximum temperature for its utilization. The same operation may be repeated respecting the other regenerators in the series, and hence it will be observed that a high temperature can be maintained continuously in the respective regenerators, as in the Siemens regenerative furnace, and the brick hot blast for heating air for blast-furnace work.

If it should be deemed necessary in practice at any time to introduce cold air, or to supplement the hot air with cold air, into the combustion-chambers of the series of regenerators for burning the gas, instead of hot air alone, cold-air-admission flues may be introduced into the hot-air flues $d'$, $d^2$, and $d^3$ inside of the valves or dampers $e$, $e'$, and $e^2$, or through the walls of the combustion-chambers of the series of regenerators close to the gas-admission and hot-air flues.

The ore under this process is heated in the kiln A with great uniformity and no part of it above the temperature of the hot air driven or drawn into the kiln plus the heat due to the oxidation of the sulphur, and as the temperature of the hot air is entirely under control of the operator within certain limits there will be absolute control over the temperature of the ore.

Another feature of this process is that there is not at any time burnt air in the kiln—that is, air which has yielded its oxygen—for it is quickly removed by the currents of fresh air. This is quite important, because air heated to 2,500° Fahrenheit expands over five times from its normal volume at the temperature of the atmosphere, and at this temperature there would only be approximately one-fifth of the oxygen present in a given volume of air at a constant pressure, and the importance of quick renewal is apparent, for otherwise, if the oxygen was consumed and there was no immediate renewal, it would give as a result an atmosphere composed mainly of nitrogen, rendering it neutral and inoperative.

I do not wish to be understood as limiting myself to the herein-described means for highly heating the air, for where natural gas is available the producers may be dispensed with, or both producers and regenerators dispensed with, and the continuous process of heating air by conduction through pipes, as in the iron blast-furnace stoves, availed of for such purposes.

I am aware that air has been more or less heated in a chamber or oven and conveyed therefrom to a kiln for the purpose of expelling carbonic acid from limestone to make the lime of commerce, as fully set forth in the Letters Patent No. 309,210, of December 16, 1884, and also that hot air has been used for heating auriferous quartz to cause its disintegration in water, as set forth in the Letters Patent No. 53,440, of March 27, 1866; and hence I do not wish to be understood as claiming, broadly, the use of heated air, but only in so far as atmospheric air is applicable to my present invention of calcining or roasting iron ores as a means of conveying the heat which has not been contaminated with the products of combustion to the ore to be heated, for the purpose of volatilizing and oxidizing the sulphur in the ore, as hereinbefore fully explained.

Having thus described the nature and objects of my invention, what I claim as new, and desire to secure by Letters Patent, is—

1. The process of calcining metallic ores, which consists in subjecting the ores to the action of highly-heated air and admitting successively and continuously currents of cold air thereto, substantially as and for the purposes set forth.

2. The process of roasting metallic ores by means of heated air, which consists in subjecting the mass of ore to the action of highly-heated air and coincidently subjecting the mass to the action of an upward current of cold air admitted at the bottom of the mass, substantially as and for the purposes set forth.

WM. J. TAYLOR.

Witnesses:
CHARLES F. ZIEGLER,
LOUIS H. KNELLER.